A. M. PENISTON.
SEEDING MACHINE.
No. 34,163. Patented Jan. 14, 1862.
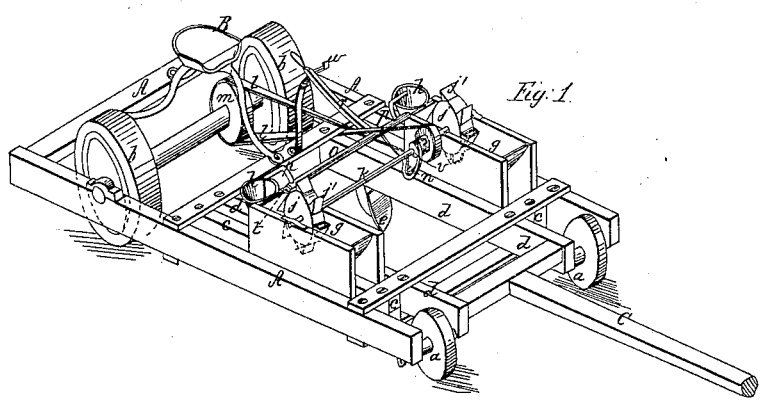
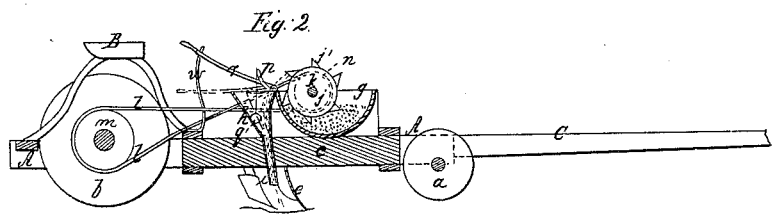
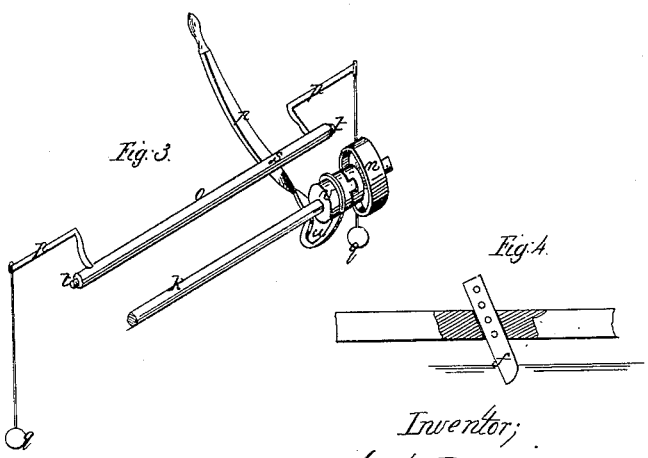
Witnesses:
Gustavus Dittrich
R. L. Cobbs.
Inventor:
A. M. Peniston
by Robt W Fenwick
Atty.

UNITED STATES PATENT OFFICE.

A. M. PENISTON, OF WELLINGTON, MISSOURI.

IMPROVEMENT IN SEEDING-MACHINES.

Specification forming part of Letters Patent No. 34,163, dated January 14, 1862.

*To all whom it may concern:*

Be it known that I, A. M. PENISTON, of Wellington, in the county of Lafayette and State of Missouri, have invented a new and useful Improvement in Seeding-Machines; and I do hereby declare that the following is a full, clear, and exact description of the same, reference being had to the accompanying drawings, forming part of this specification, in which—

Figure 1 is perspective view of my improved machine. Fig. 2 is a vertical longitudinal section of the same, the ball-valves being open or raised out of their seats. Fig. 3 is an enlarged perspective view of the crank-shaft, ball-valves, clutch, and lever disconnected from the machine. Fig. 4 is a side view of a beam with colter.

The nature of my invention consists in the arrangement, with a seed-planter substantially such as hereinafter described, of the rock-shaft, plug or ball valves, lever with curved slot, and the clutch, all in the manner described.

To enable others skilled in the art to make and use my invention, I will proceed to describe its construction and operation.

A represents a seed-planter frame mounted upon front wheels, $a\ a$, and hind wheels, $b\ b$, and with a driver's seat, B, over the hind axle of the wheels $b\ b$. The frame has two inner side beams, $c\ d$, on each side of its center, and between the two innermost beams a swinging tongue, C, is arranged. The beams $c\ c$ have shovel-plows $e$ or sharp colters $f$ attached to their under side, and the beams $d\ d$ have mold-board or covering plows similarly attached to them. The colters are used in planting sod or prairie land.

On the top of the frame, directly over the beams $c\ c$, semicircular hoppers $g\ g$ are arranged, and in rear of these hoppers funnel-shaped conductors $h\ h$ are provided, these conductors communicating with seed-tubes $i\ i$, which extend down through the beams $c\ c$ and terminate near the base of the shovel-plows $e\ e$.

In each of the hoppers a cylinder, $j$, with cups $j'$, is arranged so as to lift grain therefrom and deposit it in the funnel-conductors. The cylinders of the two hoppers are connected by means of a revolving shaft, $k$, said shaft extending across the frame, and being driven by means of a crossed belt, $l$, which leads from a pulley, $m$, on the axle of the hind wheels to a loose pulley, $n$, on the shaft $k$.

In rear of the shaft $k$ a rocking shaft, $o$, is arranged, the angular arms $p\ p$ of said shaft overhanging the funnel-conductors, and having plug or ball valves $q\ q$ suspended from them. The ball-valves are raised and lowered by the rocking shaft, when said shaft is operated by means of a hand-lever, $r$. When the valves are raised the seed deposited in the funnel-conductors passes immediately out of the conductors into the ground, and consequently is planted in drills; but when the valves are lowered the escape of the seed through the conductors is prevented, and therefore if it is desired to plant in hills it can be done, for by retaining the seed in the conductors until the machine moves from one hill to another a sufficient quantity for each hill will thus be collected, and by periodically raising the valves the same will readily find an exit and fall into the hill prepared for its reception. The lever $r$ has its fulcrum in the rock-shaft at $s$, and also at $t\ t$, and one of its ends is constructed with a curved slot, $u$, so as to encircle a sliding clutch, $v$, as represented. The clutch gears with the pulley $n$ by means of notches in the hub of the pulley and projections on the face of the clutch.

Near the front of the driver's seat B a notched stop-bar, $w$, is provided. This bar holds the rear end of the lever $r$ in place after the valves $q\ q$ or the clutch $v$ has been adjusted.

From the foregoing description it will be seen that by depressing the lever to the position shown in red, Fig. 2, the plug-valves will close up the passage at the bottom of the funnel-conductors, and that the seed deposited into the conductors will be retained until a sufficient quantity for a hill shall have been collected, by which time the machine will have moved from one hill to another. At this stage the valves are raised by the lever and the seed allowed to descend into the hill. Thus the machine answers for planting in hills. It will also be seen that by raising the lever the valves will be lifted out of their seats and the escape of the seed allowed.

It will further be seen that by holding the valves elevated the seed will be unobstructed, and therefore, instead of being planted in hills, as just described, will be planted in drills.

It will also be seen that by moving the lever laterally the clutch will be thrown out of gear and the planting stopped.

What I claim as my invention, and desire to secure by Letters Patent, is—

The arrangement and combination, with a seed-planter substantially such as herein described, of the rock-shaft $o$ $p$ $p$, plug or ball valves $q$ $q$, lever $r$, with a curved slot, $u$, and the sliding clutch $v$, as and for the purposes herein set forth.

A. M. PENISTON,

Witnesses:
M. JACKSON,
C. D. KAVANAUH.